W. H. HONISS.
ADJUSTMENT AND INDICATOR FOR GLASS WORKING MACHINES.
APPLICATION FILED MAR. 28, 1917.
1,331,467.
Patented Feb. 17, 1920.
3 SHEETS—SHEET 3.
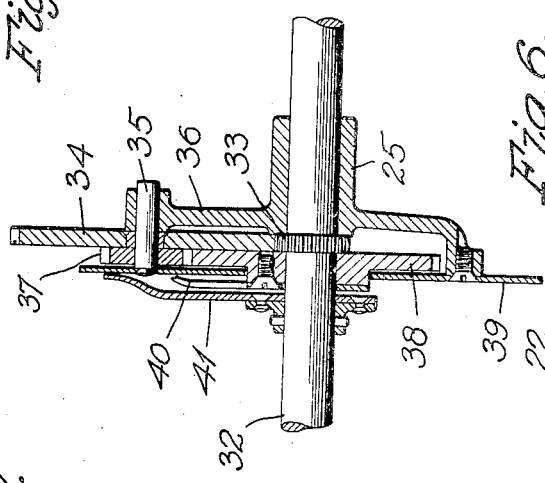
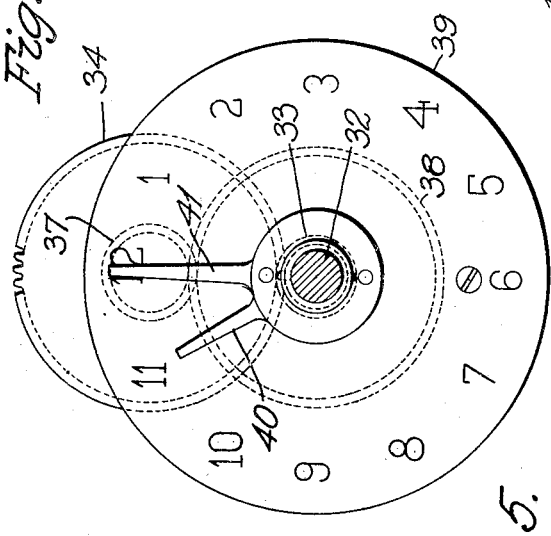
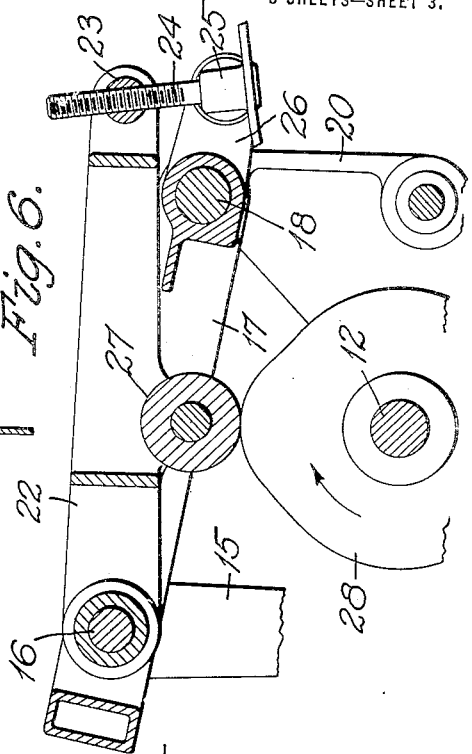
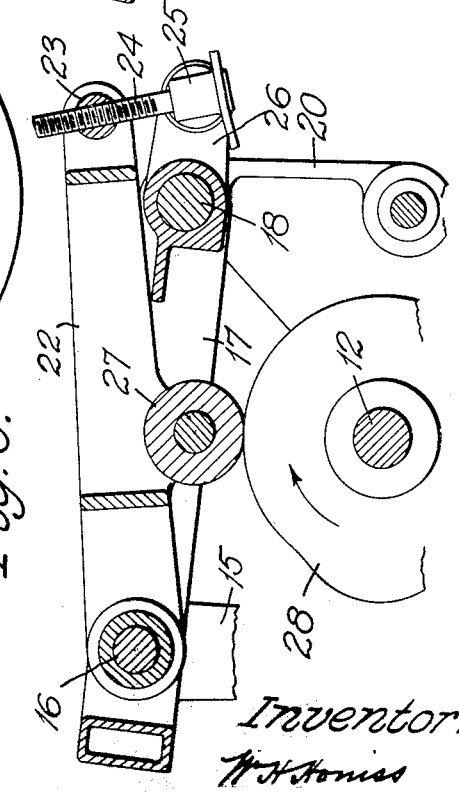
Witness:
Ernest L. Jarvis
Inventor:
W. H. Honiss

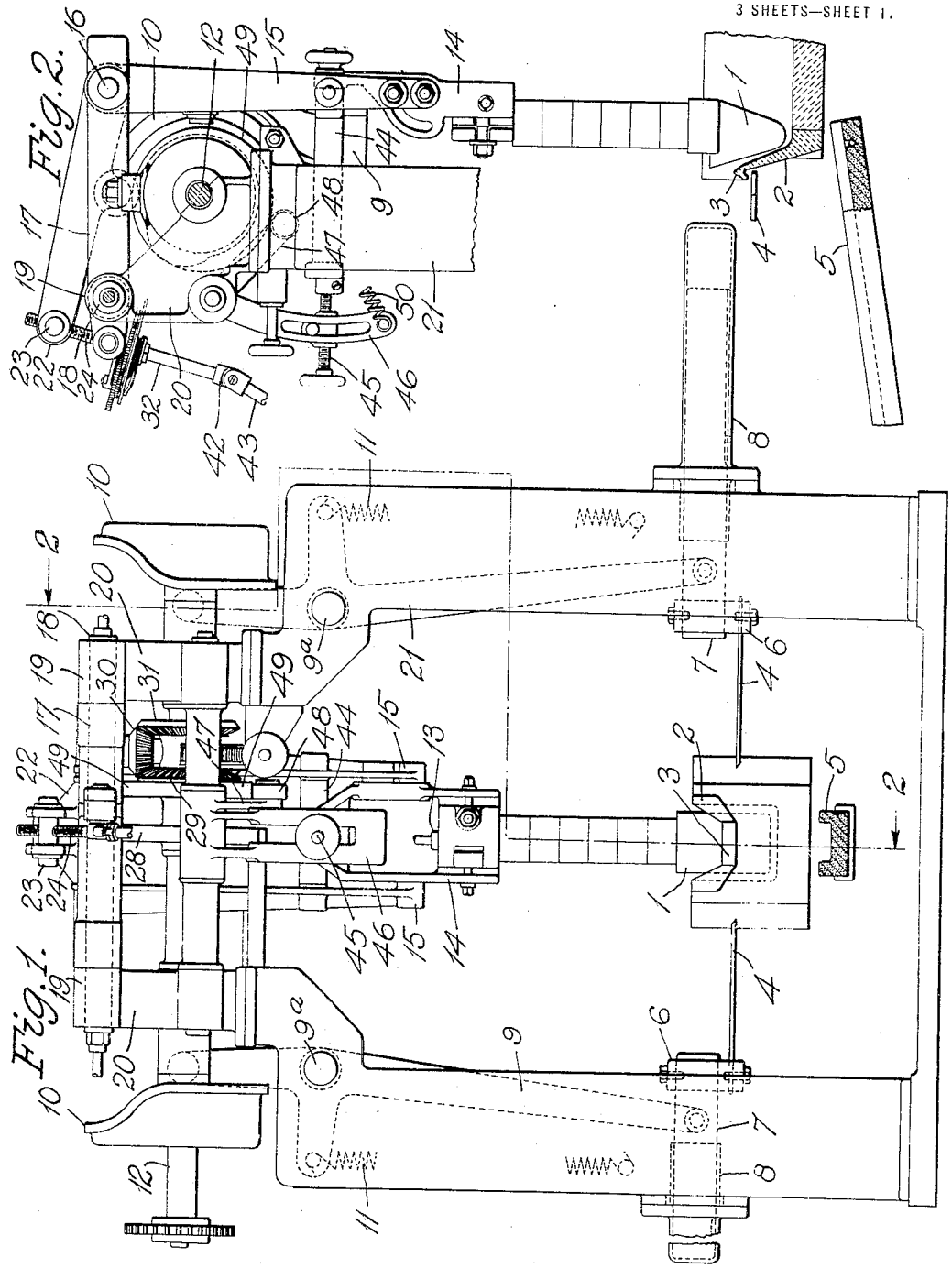

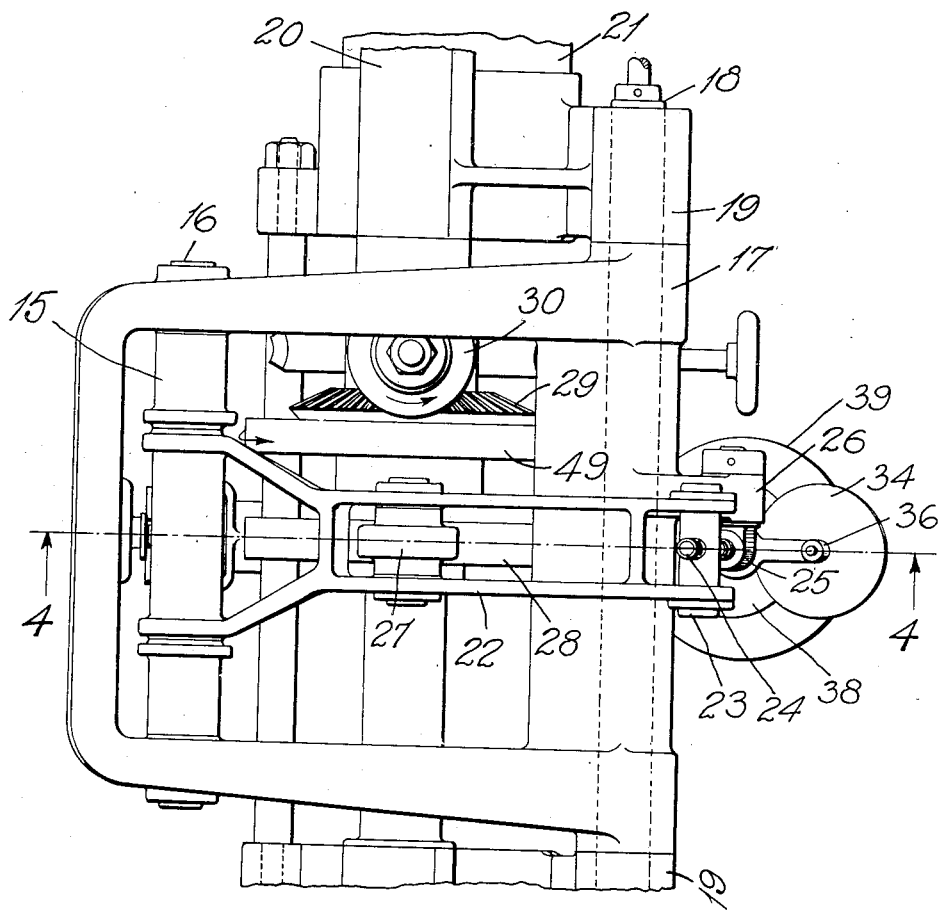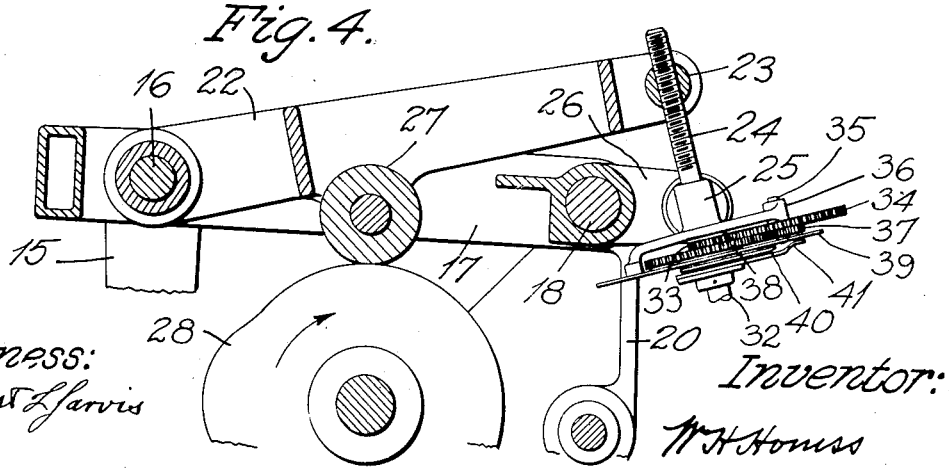

UNITED STATES PATENT OFFICE.

WILLIAM H. HONISS, OF HARTFORD, CONNECTICUT, ASSIGNOR TO HARTFORD-FAIRMONT COMPANY, OF CANAJOHARIE, NEW YORK, A CORPORATION OF NEW YORK.

ADJUSTMENT AND INDICATOR FOR GLASS-WORKING MACHINES.

1,331,467.  Specification of Letters Patent.  Patented Feb. 17, 1920.

Application filed March 28, 1917. Serial No. 157,965.

*To all whom it may concern:*

Be it known that I, WILLIAM H. HONISS, a citizen of the United States, residing at Hartford, in the county of Hartford and State of Connecticut, have invented new and useful Improvements in Adjustments and Indicators for Glass-Working Machines, of which the following is a specification.

This invention relates to the construction and arrangement of glass working machines, whereby its parts may be readily adjusted while in operation, and its various adjustments through an extended range be visibly indicated with accuracy and certainty by a simple system easily understood by anyone capable of reading the time of day upon an ordinary clock dial.

In the working of molten glass, and particularly in the flowing or feeding of the glass into mold charges, it is important to maintain uniformity of the conditions within the rather close limits necessary to maintain it in suitable plastic condition for flowing and shaping. Anything more than a momentary interruption in the flow or feed of the glass subjects it to chilling action, which increases its viscosity, thereby changing the rate and uniformity of its subsequent flow, requiring considerable time after the flowing or feeding is resumed, to work out the chilled glass, which must run to waste. Thus the effect of any appreciable interruption extends considerably beyond the period of interruption itself and includes the resulting interruption of the work of the shaping or other machinery to which the glass is being delivered.

In machinery for feeding or flowing molten glass, certain adjustments of the working parts are necessary in order to compensate for such changes in the viscosity of the glass as are liable to occur in regular operation, and also to provide for changing the rate of volume or flow for different sizes of glassware, or for greater frequency of action. For the reasons above given, it is highly desirable to make these necessary changes and adjustments while the machine is in operation; and it is also important to visually indicate the character, direction and extent of the adjustments in order that the operator may, with promptness, certainty and accuracy, change the adjustments in one direction or another to a definite and determinable extent, and be able to return with exactness to a particular adjustment, or to any number of such particular adjustments for different purposes or conditions.

The component parts of a glass working machine, and especially the members which work directly in the glass, are usually too hot to be adjusted directly by hand, requiring intervening devices to effect the required adjustments, and because of the usual heavy weight of such parts it is desirable to employ reducing leverage or gearing between the glass working members and their adjusting devices, thus involving a corresponding multiplication or increase of the movement required at the adjusting end. These conditions increase the difficulty of indicating or observing, or in any way determining the movements required at the adjusting end to effect the desired adjustment of the member to be adjusted.

The object of the present invention is to provide for these conditions by means of simple mechanism, so constructed that it can be extended to within convenient reach and observation of the operator, who may be at some distance away from the furnace, and to provide for indicating the various adjustments so that they may easily be seen and any desired change in the adjustment may be definitely and promptly made.

This invention, although adaptable to various forms of glass working apparatus is herein shown as applied to a feeding machine of the type shown and described in the patent application of Karl E. Peiler, Serial No. 856,548, filed August 13, 1914. This type of machine has a paddle or plunger which is swung back and forth, and raised and lowered in the molten glass in the outlet spout or forehearth of a melting furnace or container to cause the molten glass to flow intermittently by pulsating movements at suitable intervals from the discharge end of the spout.

In the accompanying drawings, Figure 1 is a front elevation of the material parts of a machine of the type referred to, which embodies the invention. Fig. 2 is a side elevation of the machine with the frame and other parts cut away on the line 2—2 of Fig. 1. Fig. 3, on larger scale, shows a top view of the paddle raising and lowering mechanism and the adjustment indicator. Fig. 4 is a vertical section of the raising and lowering mechanisms on the plane indicated by the line 4—4 on Fig. 3. Fig. 5 is a similar view with the adjustment indicator omitted, and with the paddle adjusted to a higher position. Fig. 6 is a similar view, with the paddle in the same adjusted position, but with the raising and lowering cam in a different position from that shown in Fig. 5. Fig. 7 is a view looking toward the face of the adjustment indicator. Fig. 8 shows a section of the adjustment indicator.

The head 1 of the paddle is by the mechanism illustrated moved back and forth and up and down in such manner as to cause waves or surges of molten glass to flow from the fore-hearth or outlet spout 2 of a glass melting furnace or other container through the discharge outlet 3 in wave-like gathers or charges and at such intervals as may be desired. The gathers or charges of molten glass thus delivered, after being severed by shears 4, drop on the trough or conduit 5, which delivers them to molds or elsewhere for the subsequent operations to which they are to be subjected. The shear blades are held by blocks 6 mounted on slides 7 carried by guides 8. The slides are moved back and forth by levers 9, which are pivoted at 9ª and are swung outwardly by cams 10 and inwardly by springs 11 when so permitted by the cams. These cams are fast on a shaft 12 which may be driven from any suitable source of power.

The heat insulated support 13 for the paddle is secured to the lower ends of a yoke 14, which yoke is adjustably fastened to the lower ends of a pair of arms 15. The upper ends of these arms are hung on a shaft 16 which is held near the back of the machine by a guide arm 17. The front end of this guide arm is pivoted on an arbor 18 which is held in bearings 19 at the upper ends of brackets 20 that are mounted on the top of the frame 21. A skeleton lever 22 has its rear end pivoted on the shaft 16 which supports the paddle arms, and which is held by the rear end of the guide arm 17. At its front end this lever 22 is provided with a swivel block 23 through which passes an adjusting screw 24 that also passes through a swivel block 25 mounted on an arm 26 which extends forwardly from the front of the guide arm. Near the middle of the machine the lever 22 carries a roll 27 resting on the cam 28. By turning the screw 24 one way or the other the relations of the lever and the guide arm can be altered as necessary to just the required degree to give the paddle which the lever supports the required up and down position for its dip into the glass. The cam 28 is secured on the hub of a bevel gear 29 that is loose on the cam shaft 12. Meshing with this bevel gear is a pinion 30 in mesh with a bevel gear 31 that is fastened to the cam shaft 12. As a result of this gearing the lift cam 28 will rotate in a direction opposite to that of the shaft 12, and the shear cams 10.

The adjustment indicator is constructed as follows:—On the stem 32 of the screw 24 which connects the swivel 25 at the front end of the saddle with the swivel 23 at the front end of the skeleton lever 22 is a pinion 33 that meshes with a gear 34 on an arbor 35 which is supported by a bracket 36 attached to the swivel block 25 carried by the guide arm. Attached to this gear 34 is a pinion 37 which engages with a gear 38 that turns loosely on the screw stem 32. Fastened to the bracket 36 is a dial 39 which may be provided on its face with any suitable series of letters or numerals as, for instance, from 1 to 12. Fastened to the gear 38 is a short pointer 40 and fastened to the screw stem 32 is a long pointer 41. With the dial numbered from 1 to 12, as indicated, the gearing is so proportioned that the small pointer will make one revolution to 12 revolutions of the large pointer, like the hands of a clock. As a result of this, when the adjusting screw is turned one revolution the large pointer makes one revolution over the face of the dial and the small pointer advances one step on the dial. The numbers on the dial can, of course, be varied; and if the numbers are varied, the gearing will be proportioned correspondingly. The screw stem may have a knob or handle, or it may be connected by a universal joint 42 with a shaft 43 that may extend to any locality within more convenient reach of the operative who is running the machine.

The arms which carry the paddle are connected by a link 44 and adjusting screw 45 with a rocker lever 46 attached to which is a cam arm 47 bearing a roll 48 that is held against the cam 49 by a spring 50. This cam 49 is fastened to the hub of the bevel gear 29 so as to turn with it and also with the lifting cam 28.

When the machine is in operation the cam 49 through the rocker arm, rocker lever, screw and link, swings the arms 15 carrying the paddle back and forth so that the paddle will move from and toward the discharge outlet of the spout leading from the furnace or container of molten glass. At the same time the lifting cam 28 through the skeleton lever 22 and guide arm 17 will raise and lower the paddle supporting arms 15 so that the paddle will rise and fall in the molten glass in the spout as it is moved back and forth. The cams are so timed that the paddle is lifted and moved back, then lowered and moved forward to cause a quantity of the molten glass to be surged out over the dam at the mouth of the spout, which quantity of glass then gathers in a drop, and after it has been cut off by the action of the shears drops onto the trough and is conducted away for further treatment. By turning the screw 45 the forward and backward path of the operative head 1 of the paddle is adjusted, and by changing the position up and down of the block which holds this adjusting screw in the rocker arm, the amplitude of the forward and back stroke of the paddle may be varied. By turning the adjusting screw 24 which connects the front end of the guide arm 17 with the front end of the skeleton lever 22 which carries the roll that bears on the lifting cam, the position of the dipping movement of the head of the paddle may be raised or lowered and with the dial mechanism described the amount of movement for adjusting the dip of the paddle is readily observable so that the operator can at any time adjust the paddle to a desired position, or can change it from one position to another as occasion may require. The dial and pointers provide a ready visual means for setting the parts as desired no matter how many turns of the screw are necessary to effect the change. With this dial the screw may be turned around many times in either direction, and the complete number of turns and partial turns will be readily indicated.

This invention may be adapted for advantageous use with any adjusting screws or adjusting gearing employed upon machines of this class in all cases where the adjusting means are turned more than one revolution, in order to visually indicate the number of revolutions and the partial revolutions of the adjusting means, thereby showing the positions to which the parts are adjusted. In the absence of such indicating means the different rotations of the screw, or of the gearing, are indistinguishable from each other, leaving the operator without any visual indication of the adjustment of the parts, and without any means of definitely observing and comparing, or of charting or recording the various adjustments, or of turning with definiteness and accuracy to any particular desired adjustment. This is of particular importance in glass working machinery in which the glass working members are more or less submerged in the glass and are also screened from view by the walls of the glass container, and by the shields usually employed for retaining the heat and for protecting the operator from its intensity.

The clock dial form of indicator, geared 1 to 12, is considered preferable because of its being universally familiar in indicating the time of day and of its adaptability for instructing the machine operators of any degree of intelligence as to the various settings required for different purposes or conditions. For example, the operator may be instructed to set the dip adjustment at 10 o'clock and the swing adjustment at 3.15, or quarter past three, for a particular size or kind of ware. With these instructions the operator may promptly and accurately set or reset the adjustments from any other adjusted positions of the parts, or return them to the former positions with complete certainty and accuracy, after experimentally or otherwise changing them to other positions.

This invention may be adapted in part, or wholly, to various uses. Those portions of the mechanism which are here shown for raising and lowering the paddle or other glass working implement, may be employed for raising and lowering the plunger in machines of the type in U. S. Patent No. 901,881, October 20, 1908, without moving that implement sidewise, in which case the cam and its connections herein shown for swinging the paddle, may be disconnected or omitted.

The invention claimed is:—

1. The combination, in a glass working machine, of a glass working member, a pivotally mounted guide arm on which the said member is pivotally supported for swinging movement, an adjustable lever pivotally mounted adjacent to the pivotal connection between the guide arm and the said member, means for adjusting the lever on its pivotal mounting in its angular relation to the guide arm, and means operating through the said lever to move the lever and the guide arm as a unitary structure.

2. The combination in a glass working machine, of a glass working member, a frame, a guide arm having one end pivoted on said frame and its other end connected to said member, a lever pivotally mounted on said guide arm, means for adjusting said lever and guide arm to vary their angular relation, and means operating on said lever between its pivotal mounting and the pivotal mounting of the guide arm for moving the lever and guide arm as a unitary structure in its various adjusted positions, to raise and lower said glass working member.

3. The combination in a glass working machine, of a glass working member, a frame, a guide arm having one end pivoted on said frame and its other end connected to said member, a lever pivotally mounted on said guide arm, adjusting means mounted on said guide arm adjacent its pivotal mounting for varying the angular relation of the guide arm and lever, and means operating on said lever between its pivotal mounting and the pivotal mounting of the guide arm for moving the lever and guide arm as a unitary structure in its various adjusted positions, to raise and lower said glass working member.

4. The combination, in a glass working machine, of a glass working member, a frame, a guide arm having one end pivoted on said frame, a pivoted lever, a pivot common to said member and lever carried in the opposite end of said cam, means for adjusting said lever and guide arm to vary their angular relation, and means operating on said lever between its pivotal mounting and the pivotal mounting of the guide arm for moving the lever and guide arm as a unitary structure in its various adjusted positions, to raise and lower said glass working member.

5. A machine for feeding molten glass having a pivoted guide arm, a glass feeding member pivotally connected to the guide arm, a lever also pivotally connected to the guide arm at a point near the pivotal axis of the glass working member, an adjusting screw connecting the lever and the guide arm near the pivot of the guide arm, and a cam arranged to engage with the lever between the connections of the lever with the guide arm.

6. A machine for feeding molten glass having a pivotally supported guide arm, swinging arms pivotally connected with the swinging end of the guide arm, a glass feeding paddle carried by said swinging arms, a lever pivotally mounted on the guide arm, adjusting means between the lever and the guide arm, a cam arranged to actuate said lever, and mechanism for rotating the cam.

7. In a glass working machine, the combination with a glass working member, of revoluble means for adjusting the said member, and means for visually indicating the revolutions of the adjusting means.

8. The combination with a machine for feeding molten glass having a glass working member, of mechanism for moving the member including a movable arm pivotally connected to said member, an adjusting lever pivoted on said arm, means for adjusting said lever relative to said arm, and means for visually indicating the movements of the adjusting means.

9. The combination with a machine for feeding molten glass, having a glass feeding paddle, and mechanism for swinging said paddle back and forth, of mechanism for raising and lowering said paddle, said latter mechanism comprising a guide arm, an adjusting lever pivotally mounted on the guide arm, an adjusting screw between the lever and the guide arm, a cam arranged to actuate said lever, and means for indicating the turns of the adjusting screw and thereby indicating the dip of the paddle.

10. In a machine for working molten glass, having a plurality of parts movable relatively to each other, an adjusting screw connecting said parts, an indicating dial, a pointer directly connected with the indicating screw and movable therewith around said dial, and a pointer indirectly connected by gearing with said adjusting screw and movable around said dial, said pointers showing the number of turns and partial turns of the adjusting screw and the relative positions of the parts connected by said screw.

11. In a machine for working molten glass, an adjustment indicating mechanism consisting of an adjusting screw, an indicating dial, a pointer directly connected with the indicating screw and movable around said dial, and a pointer indirectly connected by gearing with said adjustment screw and movable around said dial for showing the number of turns and partial turns of the adjusting screw.

12. A machine for feeding molten glass, having a glass feeding paddle, a pivot carrying the paddle, a guide arm holding the pivot, a lever pivotally connected to the guide arm, an adjusting screw connecting the lever and the guide arm, means for indicating the turns of the adjusting screw and thereby indicating the dip of the paddle, a cam arranged to actuate said lever, a rocker lever mounted on the frame, connections between said rocker lever and the paddle, a cam for actuating the rocker lever, and mechanism for rotating the cams.

13. The combination with a machine for feeding molten glass having a glass feeding paddle, of an arm connected to said paddle for guiding and moving the same, a lever pivotally connected to the arm, an adjusting screw connecting the lever and arm, a dial carried by the arm, two pointers connected with the adjusting screw to move at different rates of speed, a cam for actuating said lever, and mechanism for rotating the cam.

Signed at Hartford, Connecticut, this 27th day of March, 1917.

WILLIAM H. HONISS.